(12) United States Patent
Dryer et al.

(10) Patent No.: US 8,324,543 B2
(45) Date of Patent: Dec. 4, 2012

(54) LIGHTPIPE FOR SEMI-ACTIVE LASER TARGET DESIGNATION

(75) Inventors: Richard Dryer, Oro Valley, AZ (US); Kenenth G. Preston, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 408 days.

(21) Appl. No.: 12/629,206

(22) Filed: Dec. 2, 2009

(65) Prior Publication Data

US 2012/0012691 A1 Jan. 19, 2012

(51) Int. Cl.
- *F41G 7/22* (2006.01)
- *F42B 15/01* (2006.01)
- *F41G 7/00* (2006.01)
- *F42B 15/00* (2006.01)

(52) U.S. Cl. .................. 244/3.16; 244/3.1; 244/3.15

(58) Field of Classification Search ............ 89/1.11; 244/3.1–3.3; 385/100, 115, 116, 119, 120; 362/551, 554, 556; 65/376, 385, 406, 408, 65/409, 410, 411; 264/1.1, 1.24, 1.28

See application file for complete search history.

(56) References Cited

U.S. PATENT DOCUMENTS

| | | | | |
|---|---|---|---|---|
| 3,088,324 A | * | 5/1963 | Strang et al. | 244/3.2 |
| 3,211,540 A | * | 10/1965 | Cole | 65/409 |
| 3,219,826 A | * | 11/1965 | Letaw, Jr. | 244/3.16 |
| 3,224,851 A | * | 12/1965 | Hicks, Jr. | 65/409 |
| 3,311,747 A | * | 3/1967 | Smith, Jr. et al. | 244/3.16 |
| 3,323,886 A | * | 6/1967 | Hays | 65/410 |
| 3,328,143 A | * | 6/1967 | Hicks, Jr. | 65/411 |
| 3,367,607 A | * | 2/1968 | Bowen, Jr. | 244/3.16 |
| 3,485,609 A | * | 12/1969 | Peck | 65/410 |
| 3,508,896 A | * | 4/1970 | Turner | 385/119 |
| 3,544,406 A | * | 12/1970 | McAllister | 385/115 |
| 3,554,721 A | * | 1/1971 | Gardner | 65/409 |
| 3,626,040 A | * | 12/1971 | Nagao et al. | 385/115 |
| 3,669,639 A | * | 6/1972 | Inoue et al. | 65/410 |
| 3,694,291 A | * | 9/1972 | McAllister | 156/431 |
| 3,711,046 A | * | 1/1973 | Barhydt et al. | 244/3.12 |
| 3,717,531 A | * | 2/1973 | Smith | 385/116 |
| 3,779,729 A | * | 12/1973 | Hicks, Jr. | 65/410 |
| 3,782,667 A | * | 1/1974 | Miller et al. | 244/3.13 |
| 3,819,442 A | * | 6/1974 | Brushenko | 385/116 |

(Continued)

OTHER PUBLICATIONS

European Patent Office "International Search Report," mailed Sep. 23, 2010; International Application No. PCT/US2010/043538 filed Jul. 28, 2010.

*Primary Examiner* — Bernarr Gregory

(74) *Attorney, Agent, or Firm* — Schwegman Lundberg & Woessner, P.A.; Gregory J. Gorrie

(57) ABSTRACT

A semi-active laser (SAL) sensing system is provided that uses a lightpipe to pass received reflected laser light from an aperture to a detector. The lightpipe facilitates further miniaturization of the SAL sensing system by taking the place of a larger lens system that would otherwise be required. For example, the use of the lightpipe in a missile or guided projectile can facilitate the placement of the SAL sensing system with other sensors in the limited available space at the front of the missile. In one embodiment, the lightpipe is formed from cladded optical fibers that are bundled together, shaped, and fused together. The core material from the optical fibers are then dissolved away, leaving the outer cladding. This remaining outer cladding remains fused together, and maintains its shape, thus forming a lightpipe that can be used in a SAL sensing system.

19 Claims, 4 Drawing Sheets

U.S. PATENT DOCUMENTS

| | | | |
|---|---|---|---|
| 3,830,667 A * | 8/1974 | Carpenter | 385/115 |
| 3,837,733 A * | 9/1974 | Shoch et al. | 244/3.17 |
| 3,872,308 A * | 3/1975 | Hopson et al. | 244/3.16 |
| 4,011,007 A * | 3/1977 | Phaneuf et al. | 385/116 |
| 4,106,726 A * | 8/1978 | Emmons et al. | 244/3.17 |
| 4,111,383 A * | 9/1978 | Allen et al. | 244/3.13 |
| 4,111,384 A * | 9/1978 | Cooper | 244/3.13 |
| 4,111,385 A * | 9/1978 | Allen | 244/3.13 |
| 4,131,248 A * | 12/1978 | Berglund | 244/3.16 |
| 4,183,664 A * | 1/1980 | Rambauske | 356/3.14 |
| 4,208,363 A * | 6/1980 | Yevick | 264/1.24 |
| 4,299,360 A * | 11/1981 | Layton | 244/3.13 |
| 4,309,746 A * | 1/1982 | Rushworth | 244/3.16 |
| 4,365,150 A | 12/1982 | Bateman | |
| 4,466,697 A * | 8/1984 | Daniel | 264/1.24 |
| 4,690,500 A * | 9/1987 | Hayami et al. | 385/116 |
| 4,759,604 A * | 7/1988 | Utsumi et al. | 385/116 |
| 4,913,505 A * | 4/1990 | Levy | 264/1.24 |
| 4,923,276 A * | 5/1990 | Wells | 244/3.16 |
| 4,967,065 A * | 10/1990 | Edwards | 244/3.16 |
| 4,988,162 A * | 1/1991 | Hayami | 385/116 |
| 5,076,825 A * | 12/1991 | Hayami et al. | 65/411 |
| 5,091,637 A * | 2/1992 | Edwards | 244/3.16 |
| 5,210,814 A * | 5/1993 | McNally | 385/116 |
| 5,259,568 A * | 11/1993 | Amon et al. | 244/3.13 |
| 5,303,373 A * | 4/1994 | Harootian, Jr. | 385/115 |
| 5,333,228 A * | 7/1994 | Kingstone | 385/100 |
| 5,533,692 A * | 7/1996 | Layton | 244/3.13 |
| 5,565,729 A | 10/1996 | Faris et al. | |
| 5,953,110 A | 9/1999 | Burns | |
| 6,061,490 A * | 5/2000 | Sera et al. | 385/115 |
| 6,237,496 B1 | 5/2001 | Abbott | |
| 6,990,278 B2 * | 1/2006 | Vakili et al. | 385/115 |
| 7,126,263 B2 | 10/2006 | Peck | |
| 7,209,615 B2 * | 4/2007 | Fishteyn | 385/115 |
| 7,429,734 B1 | 9/2008 | Tidwell | |
| 7,460,755 B2 * | 12/2008 | Bruesselbach et al. | 385/116 |
| 7,498,558 B2 | 3/2009 | Sparrold et al. | |
| 7,511,253 B2 * | 3/2009 | Turner | 244/3.1 |
| 7,530,528 B2 | 5/2009 | Jenkins et al. | |
| 7,692,125 B1 * | 4/2010 | Williams | 244/3.1 |
| 7,858,910 B2 * | 12/2010 | Williams | 244/3.16 |
| 8,071,927 B2 * | 12/2011 | Hilgemann et al. | 244/3.16 |
| 2002/0005942 A1 | 1/2002 | Perry | |
| 2004/0101261 A1 | 5/2004 | Rosine et al. | |
| 2005/0103986 A1 | 5/2005 | Hartman | |
| 2006/0221328 A1 * | 10/2006 | Rouly | 244/3.16 |
| 2008/0055922 A1 * | 3/2008 | Endo et al. | 362/556 |
| 2009/0078817 A1 | 3/2009 | Williams | |

* cited by examiner

LIGHTPIPE FOR SEMI-ACTIVE LASER TARGET DESIGNATION

TECHNICAL FIELD

The present invention relates to guidance systems, including semi-active laser (SAL) designation of targets.

BACKGROUND

A variety of guidance systems are used in military applications. As one example, semi-active laser (SAL) designation is used in military systems to designate targets and guide a missile or other weapon to the target. In a typical SAL system, the operator of a SAL designator fires a narrow pulsed laser beam at a target. The SAL designator may be man-portable or carried by a designator aircraft such as an unmanned aerial vehicle (UAV).

The laser beam fired by the SAL designator reflects off the target to provide a reflected spot that can be detected by a SAL sensing system. When the designated target is within range, the SAL sensing system starts processing the detected returns to detect the spot, acquire the designated target and to verify that the SAL designator was the source. The SAL sensing system includes processing equipment for generating guidance commands from the pulse-stream to guide the weapon to impact.

The SAL system thus provides the ability to precisely guide weapons to a designated target. Furthermore, the SAL system provides a "man-in-the-loop" capability that is preferred in many battlefield situations.

One issue in SAL a system is the physical area required on the receiver. A SAL sensing system includes the lenses and electronics needed to receive the reflected laser beam and generate the required guidance commands. The lenses and electronics can require significant space, particularly when included on a missile or other relatively small weapon. This issue is particularly acute when the nose of the weapon must also include other devices, such as other sensors and processing devices.

Thus, there remains a continuing need for SAL systems in general, and SAL sensing systems in particular, that can be adapted for the small spaces that are typically available on missile or other weapon. Other desirable features and characteristics of the present invention will become apparent from the subsequent Detailed Description and the appended Claims, taken in conjunction with the accompanying Drawings and this Background.

BRIEF SUMMARY

A semi-active laser (SAL) sensing system is provided that uses a lightpipe to pass received reflected laser light from an aperture to a detector. The lightpipe facilitates further miniaturization of the SAL sensing system by taking the place of a larger lens system that would otherwise be required. Furthermore, the size and shape of the lightpipe provides additional design flexibility in the placement of the detector and other nearby elements. For example, the use of the lightpipe in a missile or guided projectile can facilitate the placement of the SAL sensing system with other sensors in the limited available space at the front of the missile.

In one embodiment, the lightpipe is formed from optical fibers, where each of the optical fibers includes a core surrounded by cladding. In this embodiment, the optical fibers are bundled together, fused, and shaped. The core material is then dissolved away from the optical fibers, while leaving the fused outer cladding. The fused outer cladding remains bundled together, thus maintaining its shape and forming a lightpipe that can be used in a SAL sensing system.

When properly configured, the lightpipe provides the optical path needed between the SAL sensing system and the detector. The lightpipe can provide this optical path in a reduced space and in a way that provides high flexibility.

BRIEF DESCRIPTION OF THE DRAWINGS

At least one example of the present invention will hereinafter be described in conjunction with the following figures, wherein like numerals denote like elements, and.

DETAILED DESCRIPTION

A semi-active laser (SAL) sensing system is provided that uses a lightpipe to pass received reflected laser light from an aperture to a detector. The lightpipe facilitates further miniaturization of the SAL sensing system by taking the place of a larger lens array that would otherwise be required. Furthermore, the size and shape of the lightpipe provides additional design flexibility in the placement of the detector and other nearby elements. For example, the use of the lightpipe in a missile or guided projectile can facilitate the placement of the SAL sensing system with other sensors in the limited available space at the front of the missile.

In one embodiment, the lightpipe is formed from optical fibers, where each of the optical fibers includes a core surrounded by cladding. In this embodiment, the optical fibers are bundled together, fused, and shaped. The core material is then dissolved away from the optical fibers, while leaving the fused outer cladding. The fused outer cladding remains bundled together, thus maintaining its shape and forming a lightpipe that can be used in a SAL sensing system.

In general, SAL systems are used in military applications where a "man-in-the-loop" capability is preferred to active designation systems that require the weapon to designate the target. Typically, there are two main parts to a SAL system, i.e., a designator used designate targets and a sensing system used to guide a weapon to the designated target. During use, the operator aims the designator to visualize the target, and typically pulls a trigger to enable the designator and fire a pulse-stream to place a laser "spot" on the target. The SAL sensing system, typically implemented on ordinance weapons such as missiles, receives the reflected returns from the target, and uses the reflected returns to guide the weapon to the target.

Figure 1:
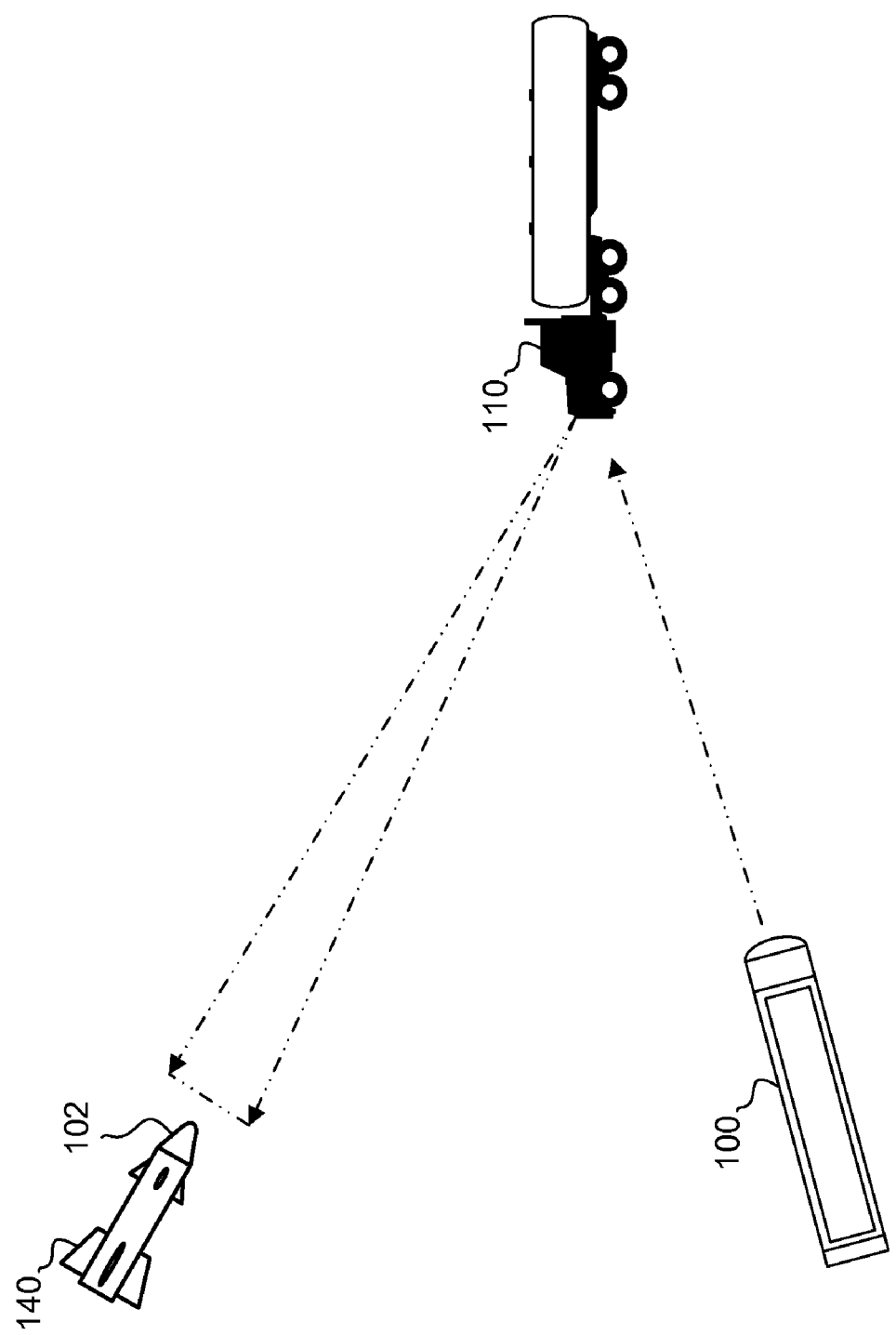
FIG. 1 is schematic view of a semi-active laser (SAL) system used in weapon systems.

Turning now to FIG. 1, an exemplary SAL sensing system 102 on a missile 140 tracks a target 110 via a spot of laser light directed at it by laser designator 100. In various SAL systems, the designator 100 may be man-portable or carried by a designator aircraft such as an unmanned aerial vehicle (UAV). The operator typically coordinates via radio with a command center and fires the SAL designator 100 to transmit a narrow pulsed laser beam to place and hold a spot on the target. When the missile 140 is in range, the SAL sensing system 102 receives the reflected returns from the target, and processes the returns to detect the spot, acquire the designated target and verify that the SAL designator was the source. The SAL sensing system 102 will typically include processing for initiating the generation of guidance commands from the reflected returns to guide the weapon to impact.

Figure 2:
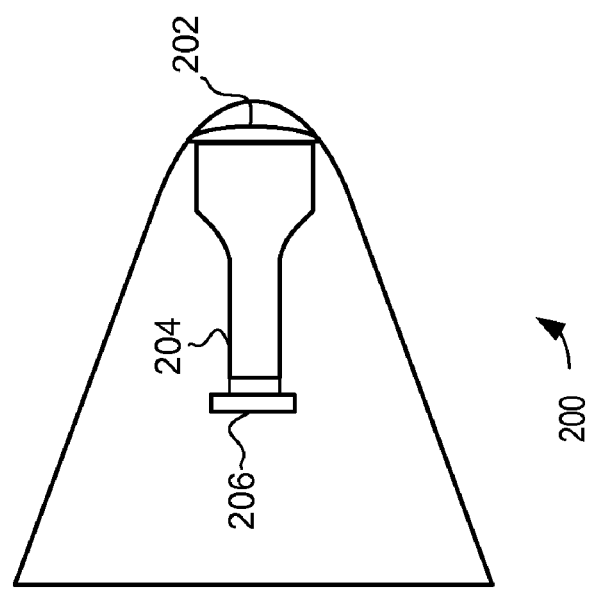
FIG. 2 is a side view of a SAL sensing system in accordance with an embodiment of the invention.

Turning now to FIG. 2, an exemplary sensing system 200 in accordance with the embodiments of the invention is illustrated schematically. The sensing system 200 includes an aperture lens 202, a lightpipe 204, and a detector 206. The aperture lens 202 is configured to receive reflected electromagnetic radiation from the target, and pass the received radiation to the lightpipe 204. The lightpipe 204 guides the received radiation to the detector 206. The detector determines the spatial distribution of the received radiation, and that spatial distribution is used to guide the missile toward the source of the reflected radiation.

In a typical embodiment, the detector 206 comprises a quad-detector that determines the received intensity at each of four quadrants on the detector. If the intensity at each of the four quadrants is balanced, then the missile is on target toward the reflected spot. If the intensity is not balanced, the associated guidance system will alter the direction until balance is again achieved. In this way, the detector 206 facilitates the guidance of the missile or other ordinance to the target. However, it should be noted that a quad-detector is just one type of detector that can be used in the sensing system 200.

In accordance with the embodiments of the invention, the lightpipe 204 is formed from a plurality of optical fibers. Each optical fiber includes a core surrounded by cladding. As will be described in greater detail below, the core and cladding materials are preferably selected such that the core can be etched away while the cladding is removed. Furthermore, the cladding is preferably selected to facilitate the propagation of light at the wavelengths of interest down the remaining cladding.

To form the lightpipe 204, the optical fibers are bundled and fused together by any suitable technique. In some embodiments the bundled optical fibers are shaped, either before and/or after they are fused. After the optical fibers are fused together, the fibers are etched to dissolve the core of the optical fibers while leaving the cladding in the fused bundle. This fused bundle of the remaining optical fiber cladding forms the lightpipe 204. Again, the optical fiber cladding is selected such that radiation in the wavelengths of interest (i.e., the wavelengths used by the SAL system to designate targets) received at one end of the lightpipe 204 will be guided toward the other end.

Figure 3:
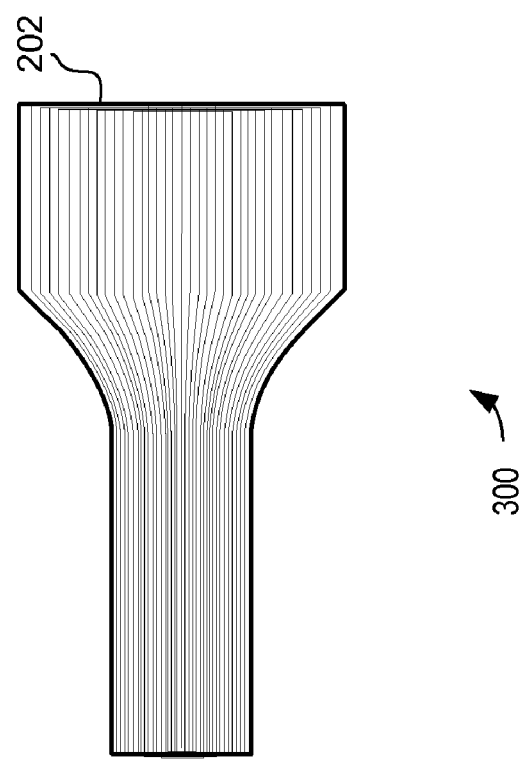
FIG. 3 is a side view of a lightpipe in accordance with an embodiment of the invention.

Turning now to FIG. 3, a specific example of a lightpipe 300 is illustrated. In this illustration, the individual claddings 302 are illustrated, although not necessarily to scale. Also in this example, the lightpipe 300 has a "necked down" shape configured to magnify the image that is provided to the detector. Typically, the shape of the lightpipe 300 would be selected to provide a desired amount of magnification for light that is provided to the sensor. Additionally, the shape of the lightpipe 300 can be configured with bends and other features designed to guide the received light around any obstacle. As other examples, the shape of the lightpipe 300 can be configured to include branches for splitting part of the light to separate receivers or other elements as may be desirable in some implementations.

The lightpipe facilitates further miniaturization of the SAL sensing system by taking the place of a larger lens system that would otherwise be required. Furthermore, the size and shape of the lightpipe provides additional design flexibility in the placement of the detector and other nearby elements. In one particular example, the use of the lightpipe facilitates the use of the SAL sensing system with other sensors such as height of burst sensors used in some weapon fuses.

Figure 4:
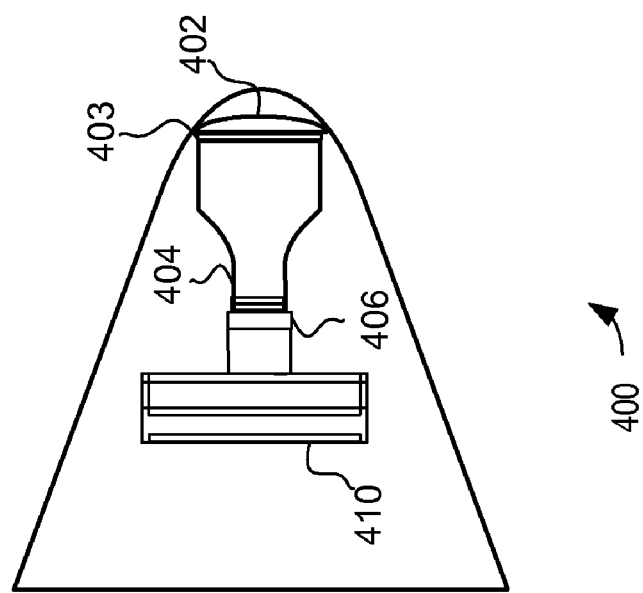
FIG. 4 is a side view of a SAL sensing system in accordance with an embodiment of the invention.

Turning now to FIG. 4, a specific example of a sensing system 400 is illustrated. The sensing system 400 includes an aperture lens 402, a scintillation plate 403, a lightpipe 404, and a detector 406. The aperture lens 402 can comprise one or more lenses that are configured to receive reflected electromagnetic radiation reflected from the target, and image the reflected radiation through the scintillation plate 403. The scintillation plate 403 conditions the image and passes the conditioned image to the lightpipe 404. The lightpipe 404 guides the received radiation to the detector 406. The detector 406 determines the spatial distribution of the received radiation, and that spatial distribution is used to guide the missile or other weapon toward the source of the reflected radiation.

In this illustrated embodiment, the sensing system 400 also includes a height-of-burst sensor 410 adapted for use as an ordinance fuse. In general, height-of-burst sensors are used to control the altitude at which ordinance detonates. A typical height-of-burst sensor will include a radio frequency (RF) transmitter and receiver that are configured to transmit and receive radio frequency waves to determine the altitude of the ordinance. The determined altitude is passed to a fuse to provide a controlled detonation at a specified altitude.

In the embodiment illustrated in FIG. 4, the height-of-burst sensor 410 is configured to be behind the SAL sensing system 400, such that the detector 406 and the lightpipe 404 are between the height-of-burst sensor 410 and the nose of the ordinance. In such an implementation, the height-of-burst sensor 410 would typically be implemented with the transmitter and receiver positioned where they will not be blocked by the detector 406. Furthermore, the use of the lightpipe 404 facilitates the combined presence of the height-of-burst sensor 410 and the SAL sensor together in relatively small space for several reasons. First, the lightpipe 404 can be configured to have a relatively small size compared to a typical lens system. Second, the lightpipe 404 can be made from materials that are relatively transparent to the RF signals used by the height-of-burst sensor 410. Thus, the use of the lightpipe 404 in the SAL sensing system 400 facilities incorporation of other devices in the limited space of a typical missile or other weapon system. Furthermore, the use of the lightpipe 404 in the SAL sensing system 400 can facilitate the use of sighting or projection systems where the packaging for such a device has limited space.

Figure 5:
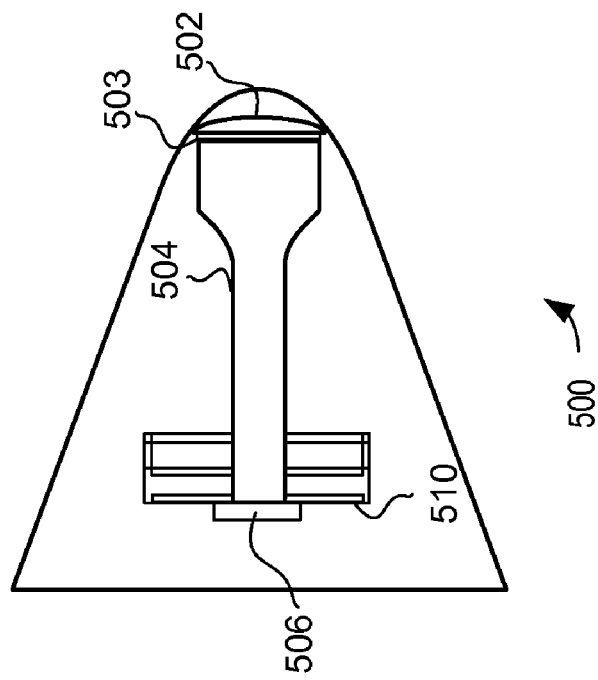
FIG. 5 is a side view of a SAL sensing system in accordance with an embodiment of the invention.

Turning now to FIG. 5, another embodiment of a sensing system 500 is illustrated. The sensing system 500 includes an aperture lens 502, a scintillation plate 503, a lightpipe 504, and a detector 506. The aperture lens 502 is again configured to receive reflected electromagnetic radiation reflected from the target, and image the reflected radiation on the scintillation plate 503. The scintillation plate 503 recombines the image and passes the recombined image to the lightpipe 504. The lightpipe 504 guides the received radiation to the detector 506. The detector 506 determines the spatial distribution of the received radiation, and that spatial distribution is used to guide toward the source of the reflected radiation.

The embodiment illustrated in FIG. 5 also includes a height-of-burst sensor 510 adapted for use as an ordinance fuse. In the embodiment illustrated in FIG. 5, the height-of-burst sensor 510 is configured to be in annular shape, with the lightpipe 504 passing through the height-of-burst sensor 510. This embodiment provides the advantage of not having the detector 506 in a position where it could block the RF signals from being transmitted or received by the height-of-burst sensor 510.

And again, the use of the lightpipe 504 facilitates the combined presence of the height-of-burst sensor 510 and the SAL sensor together in relatively small space for several reasons. First, the lightpipe 504 is configured to guide the received radiation past the height-of burst sensor 510, allowing the detector 506 to be behind the height-of-burst sensor 510. Second, the lightpipe 504 can again be configured to have a relatively small size compared to a typical lens system and can be made to be relatively transparent to the RF signals used by the height-of-burst sensor 510. Thus, the use of the lightpipe 504 in the SAL sensing system 500 again facilities the use of other devices in the limited space of a typical missile or other weapon system.

Figure 6:
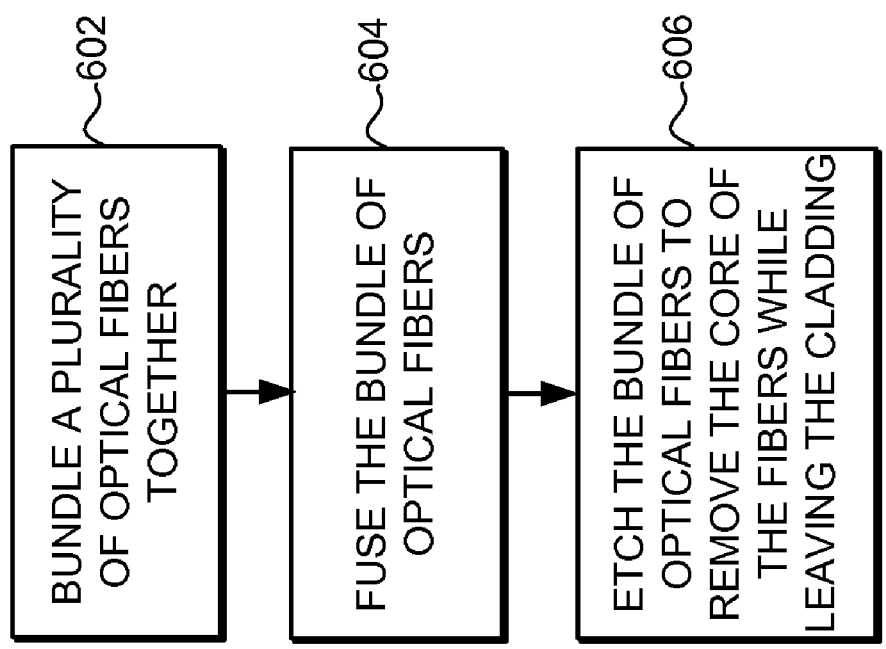
FIG. 6 is a flow diagram of a method for forming a lightpipe in accordance with an embodiment of the invention.

Turning now to FIG. 6, a method 600 for forming a lightpipe in accordance with one embodiment of the invention is illustrated. The first step 602 is to bundle a plurality of optical fibers together. The optical fibers used in method 600 include an optical core surrounded by cladding. The core and cladding are preferably made of materials such that the core can be dissolved away while the leaving the cladding behind. Additionally, the cladding is selected to have the appropriate indices of refraction for electromagnetic wavelengths used by the SAL system. Typically, such a material is selected to be highly reflective at the wavelengths and propagation angles at issue. Examples of suitable optical fiber materials that may be used include leaded glass for cladding that is insoluble to etchant, and a non-leaded glass core that is soluble to etchant. In other examples, any optical fiber material that can be clad coated, extruded and then dissolved can be used.

Such optical fibers can be constructed by using tubes of specially formulated glass, such as lead-oxide that has optimized for its reflectivity. In such tubes are inserted a solid core of glass. The filled tubes can then be softened and drawn to form a monofiber optical fiber. One specific example of this technique is described in U.S. Pat. No. 7,126,263. This technique vertically suspends cores and cladding in a draw machine that incorporates a zone furnace. When the temperature of the furnace is sufficiently elevated, the core and cladding fuse together and are drawn into a single fiber, which can then be fed into a traction machine to achieve the desired fiber diameter.

Again, this is just one example of the type of optical fibers that can be used. In general, any suitable optical fiber that includes a core that can dissolved away while leaving the cladding can be used In step 602 the optical fibers can be bundled together using any suitable technique. A typical lightpipe could include millions of such optical fibers bound together, although the exact number of optical fibers used would depend upon the details of the implementation.

The next step 604 in method 600 is to fuse the bundle of optical fibers together. This step can be accomplished with a variety of techniques. As one example, the optical fibers can be fused together by heating to an appropriate temperature. For example, by heating at a temperature of between 500 and 800 degrees. In some embodiments the heating would be accompanied with pressure. As another example, the optical fibers can be fused by cold pressing the bundle together. In this embodiment, the cold pressing itself causes the fibers to bond together.

In some embodiments, the fused bundle of optical fibers would be cut to the appropriate length after fusing, and then polished at the ends. However, in other embodiments the cutting and polishing could be performed after the etching described below.

It should be noted that the bundling and fusing of the optical fibers together increases the percentage of area that is available for light transmission. Specifically, a loose bundle of optical fibers would typically only fill 75 percent of the available space with fiber. When the fibers are pressed together and fused, the individual fibers are pressed into a substantially hexagonal shape. With the bundle of fibers so pressed together and fused, the optical fibers can fill more than 90 percent of the available space within the bundle. This increases the transmission efficiency of the bundle, and thus can increase the light that is provided to the sensor.

The next step 606 in method 600 is to etch the fused bundle of optical fibers to remove the core material of the fibers, while leaving the cladding. This can be accomplished with a variety of techniques. For example, a suitable acid bath can be used to dissolve away the core materials while leaving the cladding behind. As two examples, the core material can be etched away using acid bath or sonic slurry. Suitable acids include dilute hydrochloric acid. Other potential techniques include the use of acetone sonic baths. In most applications the technique used would depend upon the specific materials in the optical fiber bundle and the requirements for etching.

In some embodiments it may be desirable clean the bundle of optical fibers after etching. In these embodiments, the etched bundle can be cleaned using an appropriate deionization solution. After being so formed, the lightpipe can be adapted for incorporation in the sensing system of a SAL. This can include final polishing, cleaning and/or shaping of the lightpipe.

A semi-active laser (SAL) sensing system is thus provided that uses a lightpipe to pass received reflected laser light from an aperture to a detector. The lightpipe facilitates further miniaturization of the SAL sensing system by taking the place of a larger lens system that would otherwise be required. Furthermore, the size and shape of the lightpipe provides additional design flexibility in the placement of the detector and other nearby elements. For example, the use of the lightpipe in a missile or guided projectile can facilitate the placement of the SAL sensing system with other sensors in the limited available space at the front of the missile. In one embodiment, the lightpipe is formed from optical fibers, where each of the optical fibers includes a core surrounded by cladding. In this embodiment, the optical fibers are bundled together, fused, and shaped. The core material is then dissolved away from the optical fibers, while leaving the fused outer cladding. The fused outer cladding remains bundled together, thus maintaining its shape and forming a lightpipe that can be used in a SAL sensing system.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A sensing system for a guidance system, the sensing system comprising:

a detector;

an aperture lens; and a lightpipe arranged to receive electromagnetic radiation from the aperture lens and guide the electromagnetic radiation to the detector, wherein the lightpipe comprises a bundle of fused optical fiber cladding.

2. The sensing system of claim 1 wherein the lightpipe is formed by:

fusing a plurality of optical fibers together, each of the optical fibers including a core and cladding surrounding the core; and etching the fused plurality of optical fibers to dissolve the core fusing, while leaving the bundle of used optical fiber cladding.

3. The sensing system of claim 1 wherein the sensing system comprises a semi-active laser sensing system.

4. The sensing system of claim 1 wherein the optical fiber cladding comprises a leaded glass.

5. The sensing system of claim 1 wherein the lightpipe is configured to pass through an opening in a height of burst sensor.

6. The sensing system of claim 1 wherein the lightpipe and the detector are configured to position the detector in front of a height of burst sensor.

7. The sensing system of claim 1 further comprising a scintillation plate, the positioned between the scintillation plate and the lightpipe.

8. The sensing system of claim 1 wherein the bundle of fused optical fiber cladding comprises cladding pressed into a substantially hexagonal shape.

9. A sensing system for a semi-active laser (SAL) guidance system, the sensing system comprising:

a detector;

an aperture lens; and a lightpipe arranged to receive electromagnetic radiation from the aperture lens and guide the electromagnetic radiation to the detector, wherein the lightpipe comprises a bundle of fused optical fiber cladding, wherein the bundle of fused optical fiber cladding comprises a plurality of optical fibers fused together, each of the optical fibers of the bundle includes cladding without a core.

10. The sensing system of claim 9 wherein the sensing system is implemented in an ordinance with a height-of-burst sensor having an opening, and wherein the lightpipe is configured to pass through the opening in the height-of-burst sensor.

11. The sensing system of claim 9 wherein the sensing system is implemented in an ordinance with a height-of-burst sensor, and wherein the lightpipe and the detector is configured to be between the height-of-burst sensor and a nose of the ordinance.

12. The sensing system of claim 9 wherein the cladding comprises a leaded glass.

13. A method for forming a lightpipe configured to receive electromagnetic radiation reflected from a target and pass the electromagnetic radiation to a detector in a sensing system, the method comprising the steps of:

bundling a plurality of optical fibers together to form a bundle of optical fibers, each of the plurality of optical fibers including a core and a cladding surrounding the core;

fusing the bundle of optical fibers;

etching the bundle of optical fibers to remove the core of each of the plurality of optical fibers while leaving the cladding of each of the plurality of optical fibers; and shaping the etched bundle of optical fibers to form the lightpipe for the sensing system.

14. The method of claim 13 wherein the cladding comprises a leaded glass material.

15. The method of claim 13 wherein the core comprises a non-leaded glass material.

16. The method of claim 13 wherein the step of fusing the bundle of optical fibers comprises heating the bundle of optical fibers.

17. The method of claim 13 wherein the step of fusing the bundle of optical fibers comprises cold pressing the bundle of optical fibers.

18. The method of claim 13 further comprising the step of cleaning the etched bundle of optical fibers with a deionization solution.

19. The method of claim 13 wherein the step of etching the bundle of optical fibers comprises etching with an acid.

* * * * *

UNITED STATES PATENT AND TRADEMARK OFFICE
CERTIFICATE OF CORRECTION

PATENT NO. : 8,324,543 B2  
APPLICATION NO. : 12/629206  
DATED : December 4, 2012  
INVENTOR(S) : Dryer et al.

Page 1 of 1

It is certified that error appears in the above-identified patent and that said Letters Patent is hereby corrected as shown below:

In the Drawings

Sheet 2 of 4, Fig. 3, reference numeral 202, delete "202" and insert --302--, therefor In the Specification In column 1, line 32, delete "SAL a" and insert --a SAL--, therefor In column 4, line 44, delete "facilities" and insert --facilitates--, therefor In column 5, line 8, delete "height-of burst" and insert --height-of-burst--, therefor In column 5, line 14, delete "facilities" and insert --facilitates--, therefor In column 5, line 24, after "while", delete "the", therefor In column 5, line 50, after "used", insert --.--, therefor Signed and Sealed this
Twenty-fifth Day of November, 2014

Michelle K. Lee
*Deputy Director of the United States Patent and Trademark Office*